United States Patent

Maggio et al.

[11] Patent Number: 6,020,699
[45] Date of Patent: Feb. 1, 2000

[54] CIRCUITRY AND METHOD FOR CONTROLLABLE SLEW RATE

[75] Inventors: Kenneth J. Maggio; Rolf Lagerquist, both of Dallas, Tex.

[73] Assignee: Texas Instruments Incorporated, Dallas, Tex.

[21] Appl. No.: 08/926,735

[22] Filed: Sep. 10, 1997

Related U.S. Application Data

[60] Provisional application No. 60/026,370, Sep. 11, 1996.

[51] Int. Cl.[7] .................................................. H02K 23/00
[52] U.S. Cl. ........................................... 318/254; 318/439
[58] Field of Search .................................... 318/254, 439, 318/432; 327/112

[56] References Cited

U.S. PATENT DOCUMENTS

| | | |
|---|---|---|
| 5,191,269 | 3/1993 | Carbolante . |
| 5,493,189 | 2/1996 | Ling et al. ................................ 318/254 |
| 5,550,446 | 8/1996 | Schlager et al. . |
| 5,825,145 | 10/1998 | Pham et al. .............................. 318/439 |

FOREIGN PATENT DOCUMENTS

| | | |
|---|---|---|
| 0 482 913 A2 | 10/1991 | European Pat. Off. . |
| 0 577 367 A2 | 6/1993 | European Pat. Off. . |
| 0 684 699 A1 | 5/1994 | European Pat. Off. . |

*Primary Examiner*—William M. Shoop, Jr.
*Assistant Examiner*—Rita Leykin
*Attorney, Agent, or Firm*—W. Daniel Swayze, Jr.; Wade James Brady, III; Richard L. Donaldson

[57] ABSTRACT

A circuit for controlling the slew rate in the stator coils of a polyphase, dc motor is provided. The circuit includes a first steady state control circuitry (12), a low side commutation circuitry (60), a second steady state control circuitry (62), and a high side commutation circuitry (64). The first steady state control circuitry (12) regulates the current through an A-coil (14) and a C-coil (18) after a high side commutation. The A-coil (14) couples to a voltage source through an HSDA (22) at one end and couples to the C-coil (18) through a center tap at the other end. The C-coil (18) couples to an LSDC (24) at its other end during this state. The low side commutation circuitry (60) performs a low side commutation by controlling the current slew rate of the C-coil (18) and a B-coil (16) as the current in the C-coil (18) is reduced to zero and the current in the B-coil (16) is increased from zero to a steady state level. The B-coil (16) couples to the center tap on one end and to an LSDB (52) at its other end. The second steady state control circuitry (62) regulates the current through the A-coil (14) and a B-coil (16) after a low side commutation. The high side commutation circuitry (64) performs a high side commutation by controlling the current slew rate of the C-coil (18) and the A-coil (14) as the current in the A-coil (14) is reduced to zero and the current in the C-coil (18) is increased from zero to a steady state level. The C-coil (18) couples between an HSDC (66) and the center tap during this state.

20 Claims, 3 Drawing Sheets

CIRCUITRY AND METHOD FOR CONTROLLABLE SLEW RATE

This application claims benefit of provisional application 60/026,370, filed Sep. 11, 1996.

TECHNICAL FIELD OF THE INVENTION

This invention relates generally to the field of control circuitry and more particularly to a circuitry and method for controllable slew rate of a polyphase dc motor.

BACKGROUND OF THE INVENTION

A variety of applications use polyphase direct current (dc) motors for providing rotational motion. In particular, applications such as hard disk drives and CD-ROM drives often use polyphase dc motors, such as three-phase dc motors, to rotate information platters including the magnetic disks of a hard disk drive. The control of the rotational speed of these information platters is often critical to overall application performance.

The rotational speed of these polyphase dc motors is controlled through the current applied to the stator windings or coils. For example, the stator windings of a three-phase dc motor may be coupled in a "Y" configuration and include an A-coil, a B-coil, and a C-coil coupled at one end at a center tap node. The remaining ends of each coil are selectively coupled to either a high side driver, a low side driver, or to an open circuit as commutation occurs. During steady state operation, current flows from a high side driver, through a first coil coupled to the high side driver, through the center tap, through a second coil coupled to the low side driver, and to the low side driver. During this time, a third coil couples to the center tap on one end while the other end is provided as an open circuit. After a period of time, a commutation occurs so that current may now flow through the third coil and either the first coil or the second coil. A commutation is the transfer of current from one path in a circuit to another. Thus, current flows through two of the three coils during a steady state operation until a commutation occurs, at which time, current then flows through one of the two coils and the third coil until the next commutation occurs.

A total of six currents may be provided in the stator windings of a three-phase dc motor through six commutations. The current flows, for example, may be provided through the stator coils in the following sequence to impart rotational motion to the rotor of the three-phase dc motor: A-coil to C-coil, A-coil to B-coil, C-coil to B-coil, C-coil to A-coil, B-coil to A-coil, and B-coil to C-coil.

Problems arise when commutating the current in the coils of the stator winding. Often, current and voltage spikes occur as a result of a commutation. These current and voltage spikes occur when current is reduced in one coil and increased in another. These current and voltage spikes may damage sensitive control circuitry. For example, voltage sensitive circuitry such as metal oxide semiconductor ("MOS") circuitry is often destroyed if breakdown voltages are violated. These current and voltage spikes require the use of integrated circuit technology and transistor technology in the control circuitry having breakdown voltages greater than the voltage spikes generated during a commutation. This results in larger geometry control circuitry translating into increased circuit size and increased power consumption.

Furthermore, additional circuitry, such as an external zener diode, must be included in the control circuitry to prevent the control circuitry from being damaged in the event that a current or voltage spike causes a breakdown voltage level to be exceeded. This further increases overall control circuitry costs, complexity, and power consumption. Also, overall system reliability suffers because in the event of failure of the external zener diode, the control circuitry may be destroyed.

Additional problems are caused by the presence of current and voltage spikes generated during commutations in the stator windings. Current and voltage spikes may create a torque ripple and establish a resonant frequency resulting in an audible noise in the 2–4 kHz range, which is a typical commutation frequency. The torque ripple may harm overall hard disk drive performance by introducing data errors caused by attempting to read data during a torque ripple.

SUMMARY OF THE INVENTION

From the foregoing it may be appreciated that a need has arisen for a circuitry and method for controllable slew rate to control the current in the coils of the stator winding of a polyphase dc motor to eliminate or reduce current and voltage spikes generated during a commutation. In accordance with the present invention, a circuitry and method for controllable slew rate of a polyphase dc motor are provided that control and eliminate current and voltage spikes which substantially eliminate the disadvantages and problems outlined above.

According to the present invention, a method for controlling the slew rate, such as the current slew rate, of the coils in a polyphase dc motor is provided that includes performing a high side commutation and regulating a first current through a first coil and a second current through a second coil. The first coil and second coil are coupled to one another at a center tap, while the opposite end of the first coil couples to a first coil high side driver for providing a current, and the other end of the second coil couples to a second coil low side driver for regulating the current through the first coil and second coil. The method further includes performing a low side commutation by reducing the second current through the second coil while correspondingly increasing a third current through a third coil, the third coil coupled between the center tap and a third coil low side driver for regulating the third current. As a result of performing the low side commutation, the second current is eventually reduced to zero and the first current is then equal to the third current. The method then includes regulating the third current and performing a high side commutation. The high side commutation is performed by reducing the first current through the first coil while correspondingly increasing the second current through the second coil while the second coil couples between the center tap and a second coil high side driver for providing a current. Eventually, the first current is reduced to zero and the second current is equal to the third current.

The present invention provides various technical advantages. A technical advantage of the present invention includes the elimination or reduction of current and voltage spikes in the stator windings of a polyphase dc motor. This results in the ability to use smaller circuitry having a lower voltage threshold, such as 0.8 micron circuitry having a five volt breakdown voltage, which in turn results in reduced power consumption. Another technical advantage of the present invention includes the elimination of an external zener diode. Yet another technical advantage of the present invention includes increased reliability. Still another technical advantage includes the reduction or elimination of torque ripple and audible noise caused by resonant frequencies. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
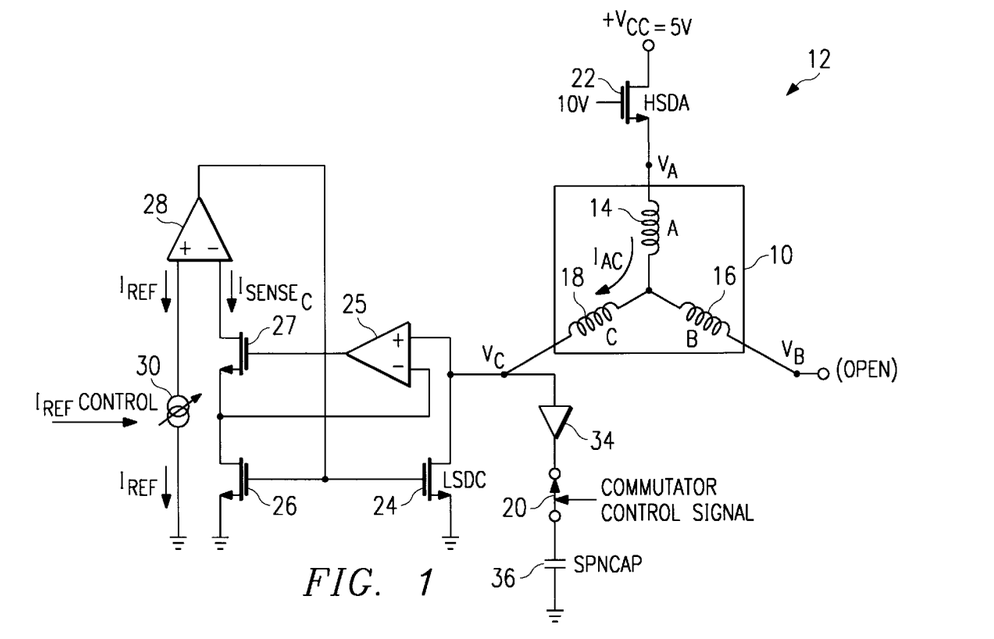
FIG. 1 is a circuit diagram illustrating a first steady state control circuitry provided after a high side commutation and representing a first state.

FIG. 1 is a circuit diagram illustrating a first steady state control circuitry 12 provided after a high side commutation and representing a first state. First steady state control circuitry 12 is shown coupled to a stator winding 10 of a brushless dc motor. Stator winding 10 is a three-phase winding coupled in a "Y" configuration and includes an A-coil 14, a B-coil 16, and a C-coil 18. A-coil 14, B-coil 16, and C-coil 18 each have a first end and a second end. The first end of each of these coils couple with one another to form a node which may be referred to as a center tap. The second end of each of these coils couple to support circuitry, such as first steady state control circuitry 12, so that current may be provided through two of these coils and the center tap at selected intervals as determined by a commutator, not shown in FIG. 1.

When current is flowing through two of the coils, the second end of one of the two coils serves as the high side while the second end of the other coil serves as the low side. The low side operates to regulate the current through the two coils. The second end of the remaining coil is provided in an open circuit state. For example, FIG. 1 illustrates the situation where the second end of A-coil 14, at node $V_A$, serves as the high side and couples to a high side driver A (HSDA) 22 so that the current provided by voltage source $V_{CC}$ may be provided through C-coil 18 to its second end at node $V_C$. HSDA 22 may be implemented as a power FET such as an n-channel MOSFET operating as a switch. The second end of C-coil 18 serves as the low side and couples to a low side driver C (LSDC) 24, which also may be a power FET such as an n-channel MOSFET operating in the saturation region, that is used to regulate the current $I_{AC}$ provided through A-coil 14 and C-coil 18. Finally, the second end of B-coil 16 is shown in an open circuit state. It should be understood that although the present invention will be described and shown as implemented using a three-phase dc motor having a three phase stator, the present invention is no way limited to a three-phase dc motor and may be implemented using a polyphase dc motor.

Figure 2:
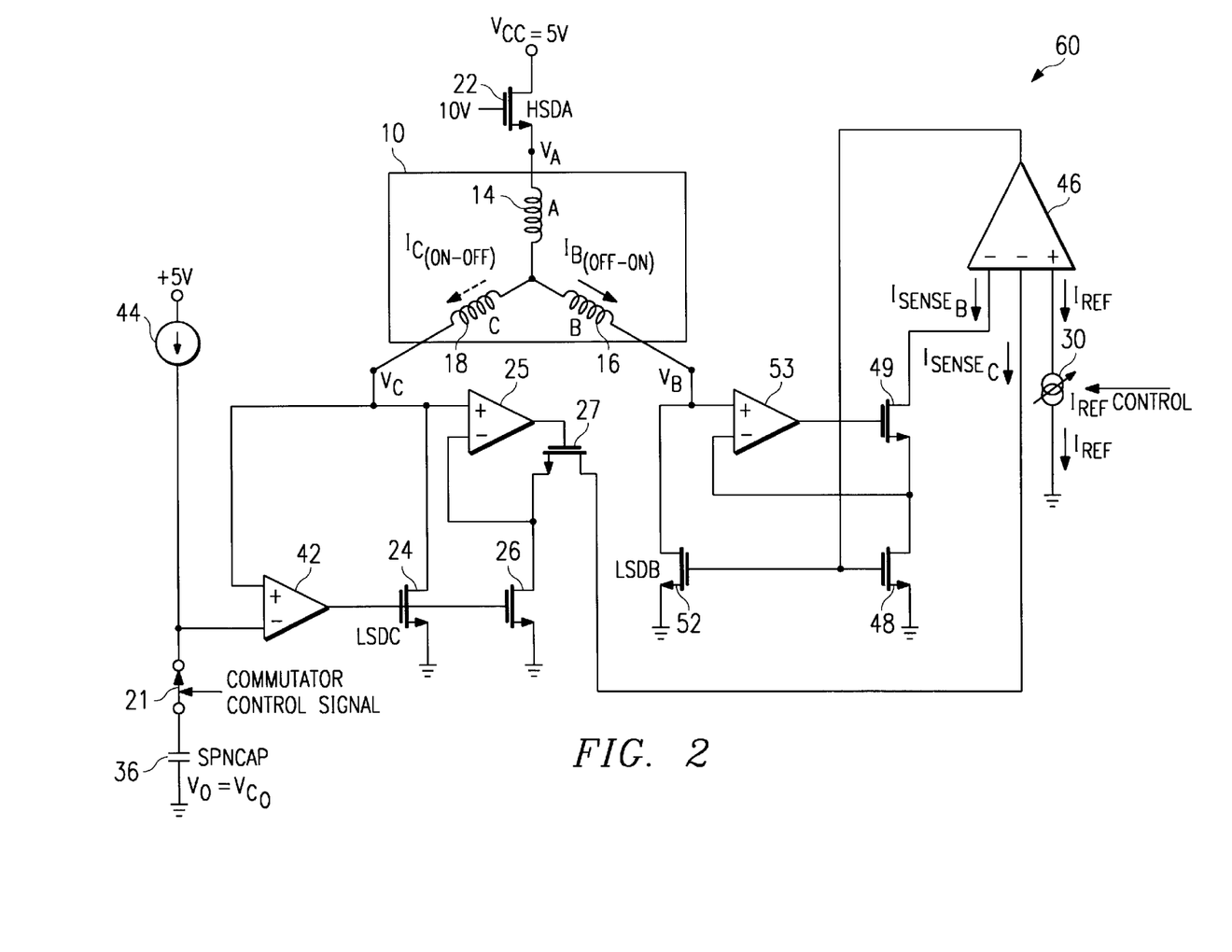
FIG. 2 is a circuit diagram illustrating a low side commutation circuitry and representing a second state.
Figure 3:
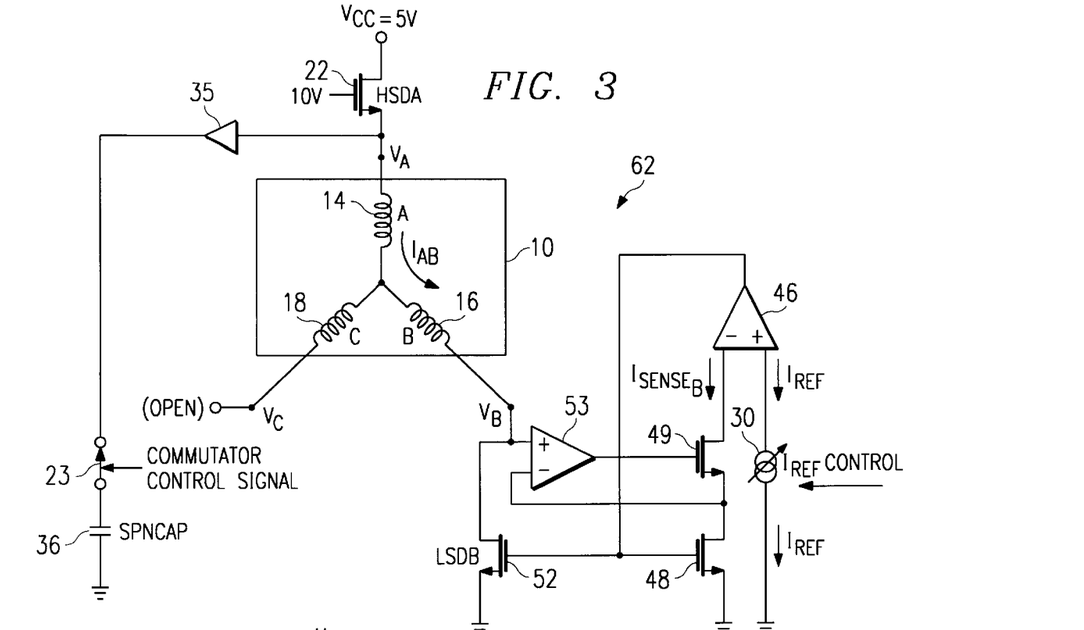
FIG. 3 is a circuit diagram illustrating a second steady state control circuitry provided after a low side commutation and representing a third state.
Figure 4:
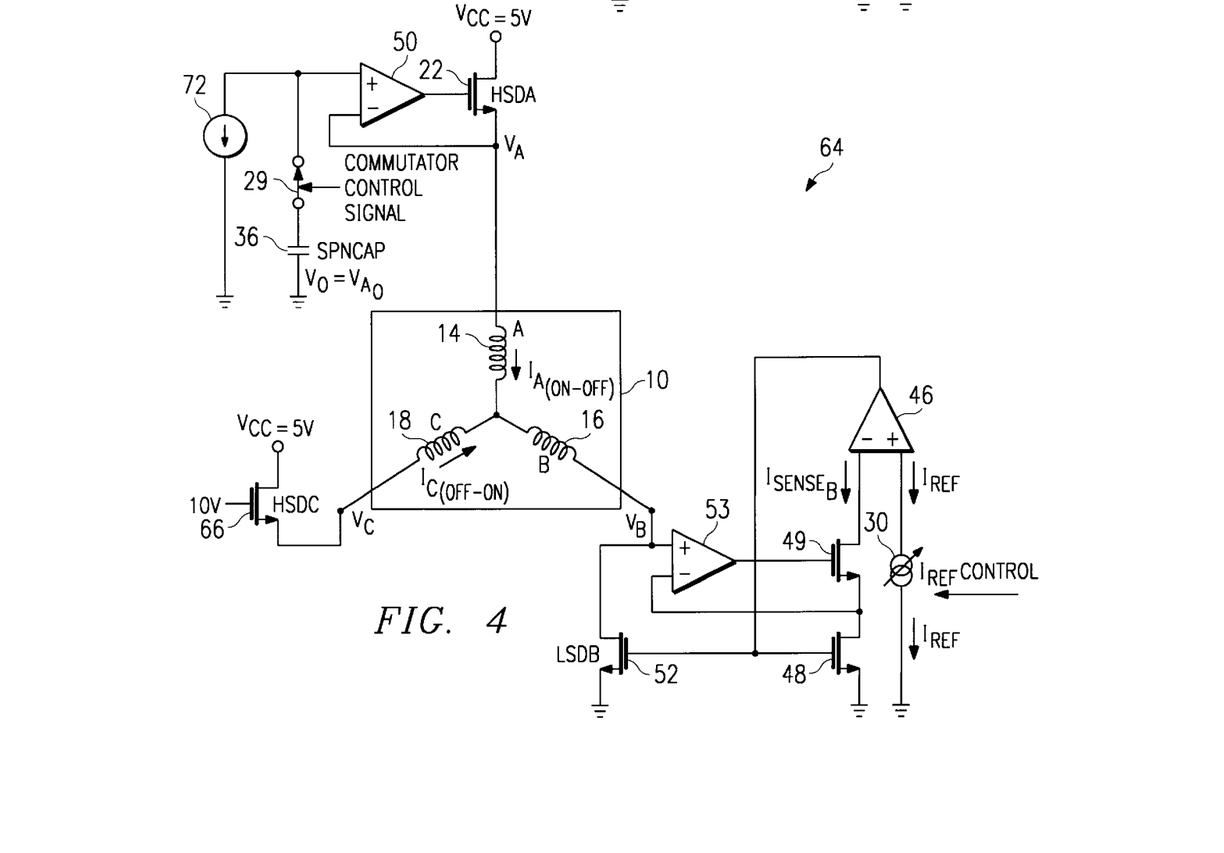
FIG. 4 is a circuit diagram illustrating a high side commutation circuitry and representing a fourth state.

There are six possible combinations of current flows when a three-phase winding, such as stator winding 10, is provided. The second end of A-coil 14, B-coil 16 and C-coil 18 may each couple to either a high side driver or a low side driver so that current may flow through any two coils and in either direction as determined by a predefined sequence. For example, current may flow in the coils of stator winding 10 in the following manner and sequence: A-coil 14 to C-coil 18; A-coil 14 to B-coil 16; C-coil 18 to B-coil 16; C-coil 18 to A-coil 14; B-coil 16 to A-coil 14; and B-coil 16 to C-coil 18. In the operation of a three-phase dc motor, each of the six current flows are established in a set sequence as current is switched from coil-to-coil of the stator winding to establish and provide rotation to a magnetic rotor, not shown in FIG. 1. The set sequence of six current flows generally proceeds in a manner such that after a high side commutation occurs, the next sequence will be a low side commutation followed by a high side commutation. For example, the current flow from A-coil 14 to C-coil 18 may be provided after a high side commutation which is then followed by a low side commutation to establish the current flow from A-coil 14 to B-coil 16. In such a case, the second end of B-coil 16 couples to its low side driver to establish and regulate the current flow from A-coil 14 to B-coil 16. This sequence of states is illustrated in FIGS. 1, 2, and 3. After a low side commutation occurs and a steady state is reached, a high side commutation occurs next. For example, a high side commutation may take place from A-coil 14 to C-coil 18 so that the current flow from C-coil 18 to B-coil 16 may be established. This state or transition is illustrated in FIG. 4.

With reference to FIG. 1, first steady state control circuitry 12 couples to stator winding 10 after a high side commutation to define a first state. First steady state control circuitry 12 provides a steady state stator current, $I_{AC}$, from A-coil 14 to C-coil 18. First, steady state control circuitry 12 includes a high side portion and a low side portion. The high side portion includes HSDA 22. The low side portion includes LSDC 24, a sense FET C 26, a voltage follower including an amplifier 25 and a FET 27, a reference amplifier 28, a reference current source 30 that is controlled by a reference current control signal, a sample amplifier 34, a capacitor switch 20, and a spindle capacitor 36.

Initially, after a high side commutation occurs, HSDA 22, acting as a switch, is turned on by applying ten volts to the gate. The gate voltage may be a ten volt supply provided by a voltage source using a charge pump. At this time, the current provided by the voltage $V_{CC}$ is provided at the drain of HSDA 22, through the source of HSDA 22, and to the second end of A-coil 14 at node $V_A$.

LSDC 24, while operating in the saturation region, is used to regulate the current provided from HSDA 22 to A-coil 14 and C-coil 18. Of course, LSDC 24 will also be used to regulate the current when the high side driver coupled to the second end of B-coil 16, not shown in FIG. 1, is used to provide the current flow from B-coil 16 to C-coil 18. The gate-to-source voltage of LSDC 24 is controlled by the output of reference amplifier 28. Reference amplifier 28 includes an $I_{senseC}$ current input and an $I_{REF}$ current input. $I_{REF}$ is generated by reference current source 30 as controlled by a reference current control signal. The reference current control signal is provided by control circuitry external to first steady state control circuitry 12. Generally, the referenced current control signal will be provided such that reference current source 30 provides a constant $I_{REF}$ during a particular state; however, the reference current control signal may be varied to vary $I_{REF}$ which results in $I_{AC}$ being provided at various levels. Reference amplifier 28 senses the difference between $I_{REF}$ and $I_{senseC}$ and generates a corresponding output signal that is used to control the gate of LSDC 24.

Sense FET C 26 is used to generate the $I_{senseC}$ current which is a scaled version of $I_{AC}$. Sense FET C 26, LSDC 24, amplifier 25, and FET 27 are configured as a current mirror such that $I_{senseC}$ is proportional to $I_{AC}$. The current mirror is formed by coupling the source and gate of sense FET C 26 and LSDC 24. The drains are coupled through a voltage follower comprising amplifier 25 and FET 27. The voltage follower provides the voltage at node $V_C$ at the drain of sense FET C 26 to effectively cascode the current mirror. Amplifier 25 may be a unity gain buffer that adjusts the gate voltage of FET 27 so that the voltage at node $V_C$ is provided at the drain of sense FET C 26. Amplifier 25 draws none or very limited current from node $V_C$ thus reducing any circuitry effect the voltage follower and other coupled circuitry may have on the operation of LSDC 24 and stator winding 10. In another embodiment, amplifier 25 may consist of cascode devices that provide an improved current mirror with a more accurate $I_{senseC}$ over a wider range of current and bias conditions.

LSDC 24 and sense FET C 26 are sized such that the resulting $I_{senseC}$ that is generated is a scaled version of $I_{AC}$. This may be accomplished by ensuring that the channel width of LSDC 24 is considerably larger than the channel width of sense FET C 26.

Reference amplifier 28 compares $I_{REF}$ and $I_{senseC}$ and generates a corresponding difference or error signal. Reference amplifier 28 subtracts the value of $I_{senseC}$ from the value of $I_{REF}$ and multiplies this difference by a corresponding gain to generate its output signal. This output signal is provided at the gate of sense FET C 26 and LSDC 24. By applying this gate voltage, reference amplifier 28 controls $I_{AC}$ by adjusting the gate-to-source voltage of LSDC 24 which is used to regulate $I_{AC}$. Once steady state is reached, the output of reference amplifier 28 should approach a constant and thus gate-to-source voltage of LSDC 24 will be maintained at a constant level. Thus, reference amplifier 28 adjusts the gate voltage of LSDC 24 so that the current flowing through A-coil 14 and C-coil 18 is proportional or related to $I_{REF}$.

While the current is flowing through A-coil 14 and C-coil 18, spindle capacitor 36 couples to the second end of C-coil 18 at node $V_C$ so that spindle capacitor 36 charges to a voltage $V_C$. Spindle capacitor 36 couples to the second end of C-coil 18 through sample amplifier 34 and capacitor switch 20. Sample amplifier 34 serves as a buffer or isolation amplifier to isolate the effects of spindle capacitor 36 on the other circuitry. Capacitor switch 20 is provided in a closed position as controlled by a commutator control signal. The commutator control signal is provided by circuitry external to first steady state control circuitry 12 and may be generated by measuring the back electromotive force (BEMF) generated between the center tap and the second end of B-coil 16. In one embodiment, the commutator control signal may be provided in an enabled state depending on the status of the BEMF. Alternatively, the commutator control signal may be generated using timer circuitry. Thus, during the time in which capacitor switch 20 is in a closed position, spindle capacitor 36 is used to sample the voltage at the low side or second end of C-coil 18.

In operation, first steady state control circuitry 12 provides and regulates current $I_{AC}$. A gate voltage is provided at HSDA 22 which allows the current from $V_{CC}$, such as that provided from a five volt supply, to be provided through HSDA 22 to node $V_A$. The current then proceeds through A-coil 14, C-coil 18, then to LSDC 24. LSDC 24 regulates $I_{AC}$ by receiving an output signal from reference amplifier 28 that regulates the gate-to-source voltage of LSDC 24. Reference amplifier 28 compares a scaled-down replica of $I_{AC}$ which is denoted as $I_{senseC}$ to $I_{REF}$ and generates its output which corresponds to the difference between these two currents. If $I_{senseC}$ is less than $I_{REF}$, a more positive output signal is provided to the gate of LSDC 24 which raises the gate-source voltage of LSDC 24 resulting in an increase in $I_{AC}$. As a result, $I_{senseC}$ will be increased until such time as it equals $I_{REF}$. If $I_{senseC}$ is greater than $I_{REF}$, reference amplifier 28 generates a less positive output signal which lowers the gate source voltage of LSDC 24 resulting in a reduced $I_{AC}$ and $I_{senseC}$. Spindle capacitor 36 is provided across node $V_C$ and charged to that voltage.

After some period of time, the circuitry switches from the first state, as shown in FIG. 1, in which a steady state current is provided through HSDA 22, A-coil 14, C-coil 18, and LSDC 24 to a second state, as shown in FIG. 2, in which a current is provided through HSDA 22, A-coil 14, B-coil 16 and a low side driver coupled to the second end of B-coil 16. This transition may be referred to as a low side commutation and is described more fully below in the discussion accompanying FIG. 2. During such a transition from a first state to a second state, it is important to prevent voltage spikes which may damage circuitry or cause errors.

FIG. 2 is a circuit diagram illustrating a low side commutation circuitry 60 representing a second state in which stator winding 10 commutates from providing current from node $V_A$ to node $V_C$ to providing current from node $V_A$ to node $V_B$. In accomplishing this, low side commutation circuitry 60 is used to control the current slew rate of C-coil 18 and B-coil 16 as the current in C-coil 18 is reduced to zero and the current in B-coil 16 is increased from zero to a steady state level. The current through the coils of stator winding 10 is illustrated as a second state of FIG. 5 and is discussed more thoroughly below.

Low side commutation circuitry 60 includes various circuit elements that are used to slowly or controllably reduce the current in C-coil 18 while simultaneously slowly increasing the current through B-coil 16 resulting in a controllable slew rate. Low side commutation circuitry 60 also includes HSDA 22 which is used to provide the current from voltage source $V_{CC}$ through A-coil 14, C-coil 18, and B-coil 16.

Initially, the voltage $V_C$, that was previously saved on spindle capacitor 36 during steady state operation after a high side commutation, is provided to an inverting terminal of a hold amplifier 42. The non-inverting terminal of hold amplifier 42 couples to the second end of C-coil 18 which has been referred to as node $V_C$. Furthermore, a constant source 44 couples to spindle capacitor 36 through a capacitor switch 21 and provides a charging current to further increase the voltage provided across spindle capacitor 36. The output of hold amplifier 42 is provided at the gate of LSDC 24 and sense FET C 26 and controls the gate-to-source voltages of these FETs. Thus, as constant current source 44 increases the voltage across spindle capacitor 36, the output of hold amplifier 42 is provided at more and more reduced value which further reduces current $I_C$ through C-coil 18 and current $I_{senseC}$ which is provided to a low side commutation reference amplifier 46. Amplifier 25 and FET 27 serve as a voltage follower and operate as described above. The current provided by constant current source 44 may be a constant current source or it may be a current source following any desired function such as a function dependent upon motor conditions such as motor speed or BEMF.

Low side commutation reference amplifier 46 controls the gate-to-source voltage of a low side driver B (LSDB) 52 and a sense FET B 48. LSDB 52 and sense FET B 48 are configured in a current mirror configuration such that a current $I_{senseB}$ is generated as a scaled version of the current $I_B$ through B-coil 16. This may be accomplished by ensuring that the channel width of LSDB 52 is considerably larger than the channel width of sense FET B 48. As is shown in FIG. 2, a voltage follower is provided between the drains of LSDB 52 and sense FET B 48. An amplifier 53 and a FET 49 are shown configured as a voltage follower across the drains of LSDB 52 and sense FET B 48. Low side commutation reference amplifier 46 adjusts the gate-to-source voltage of LSDB 52 and sense FEB B 48 by comparing a current $I_{REF}$, generated by reference current source 30 as controlled by the reference current control signal, to $I_{senseC}$ and $I_{senseB}$. As $I_{senseC}$ continues to decrease, as controlled by the output of hold amplifier 42, low side commutation reference amplifier 46 responsively and concurrently increases $I_{senseB}$ and $I_B$ by increasing the gate-to-source voltage of LSDB 52 and sense FET B 48 which allows more current to flow through sense FET B 48 and LSDB 52.

The voltage on spindle capacitor 36 continues to increase as a constant current source 44 provides current to spindle capacitor 36 so that spindle capacitor 36 continues to charge. During this time, capacitor switch 21, as controlled through the commutator control signal, is provided in a closed state. Eventually, as the voltage across spindle capacitor 36 continues to rise in a somewhat linear fashion from an initial value about equal to the voltage $V_C$ until such time as the gate-to-source voltage of LSDC 24 is lowered below the threshold voltage of LSDC 24, $I_C$ is reduced to zero along with $I_{senseC}$. This may occur when the gate-to-source voltage reaches around 0.6 volts or less.

Figure 5:
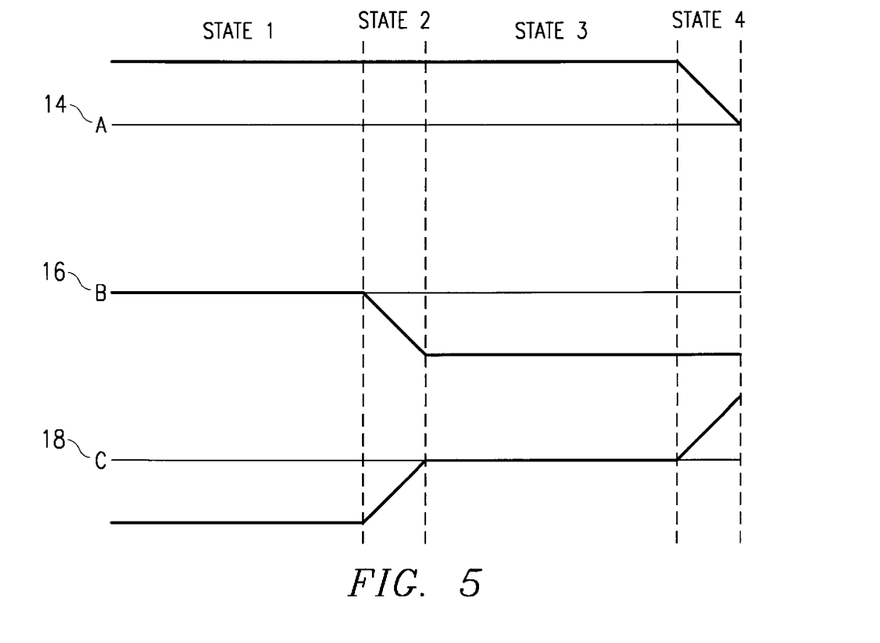
FIG. 5 is a timing diagram illustrating the controlled stator currents in each phase of a three phase stator winding of a dc motor during the states illustrated in FIGS. 1 through 4.

FIG. 3 is a circuit diagram illustrating a second steady state control circuitry 62 that is provided after a low side commutation and representing a third state as illustrated in FIG. 5 and discussed below. Second steady state control circuitry 62 is shown coupled to stator winding 10 after a low side commutation from node $V_C$ to node $V_B$ to provide a steady state current $I_{AB}$ through A-coil 14 and B-coil 16.

HSDA 22 is still coupled to $V_{CC}$ to provide a current to the second end of A-coil 14 at node VA. While HSDA 22 provides a current at node $V_A$, additional circuitry of second steady state control circuitry 62 couples through the second end of B-coil 16 at node $V_B$ to regulate $I_{AB}$. In particular, LSDB 52 and sense FET B 48 are configured in a current mirror configuration with a voltage follower used to couple their drains. The voltage follower includes amplifier 53 and FET 49.

Low side commutation reference amplifier 46 compares $I_{senseB}$ and $I_{REF}$ to generate an output signal that is used to control the gate-to-source voltage of LSDB 52 and sense FET B 48. Low side commutation reference amplifier 46 compares the value of $I_{REF}$, as set through reference current source 30 and the reference current control signal, and generates a more positive output signal if $I_{REF}$ is greater than $I_{sense}$ resulting in an increase in $I_{AB}$ and $I_{senseB}$. If $I_{REF}$ is less than $I_{senseB}$, low side commutation reference amplifier 46 generates a less positive output signal resulting in a lower $I_{AB}$ and $I_{senseB}$. Eventually, second steady state control circuitry 62 settles into a steady state.

While $I_{AB}$ is being provided through A-coil 14 and B-coil 16, spindle capacitor 36 couples to node $V_A$ through a capacitor switch 23 and a sample amplifier 35. Sample amplifier 35 serves as a buffer or isolation amplifier to isolate the effects of spindle capacitor 36 on the other circuitry. Capacitor switch 23 is provided in a closed state as controlled by the commutator control signal. This configuration results in a voltage $V_A$ being stored by spindle capacitor 36.

FIG. 4 is a circuit diagram illustrating a high side commutation circuitry 64 and representing a fourth state as shown in FIG. 5. High side commutation circuitry 64 is used to perform a high side commutation in which A-coil 14 transitions from serving as the high side to C-coil 18 serving as the high side. As a consequence, the current $I_A$ is controllably reduced while the current $I_C$ is correspondingly controllably increased. During this high side commutation or transition that is defined as the fourth state, the circuitry coupled through the second end of B-coil 16 at node $V_B$ continues to operate as described above with respect to FIG. 3 and performs low side regulation ensuring that current $I_B$ continues to flow through B-coil 16.

The gate of HSDA 22 couples to the output of a hold amplifier 50 while the inverting terminal of hold amplifier 50 couples directly to the source of HSDA 22. The non-inverting terminal of hold amplifier 50 couples to one node of the parallel connection between a current source 72 and spindle capacitor 36. A capacitor switch 29 is provided in a closed circuit state, as controlled by the commutator control signal, thus allowing spindle capacitor 36 to couple to the non-inverting terminal of hold amplifier 50. Spindle capacitor 36 initially contains the voltage $V_A$ and this voltage is linearly reduced by the depletion of charge across spindle capacitor 36 caused by current source 72.

HSDA 22 initially has ten volts provided at its gate. This voltage is reduced in a somewhat linear fashion corresponding to the reduction of the voltage across spindle capacitor 36 caused by current source 72. As the output of hold amplifier 50 decreases, the voltage $V_A$ also decreases resulting in a reduction in $I_A$. Although current source 72 has been described as a constant current source, current source 72 could be provided at a rate dependent upon motor conditions such as motor speed or BEMF. This may be at a predefined or definable rate.

While the circuitry coupled to node $V_A$ operates to reduce current $I_A$, circuitry coupled to node $V_C$ concurrently operates to increase $I_C$ through C-coil 18. A high side driver C (HSDC) 66 is used to provide a current provided from a five volt voltage source $V_{CC}$. HSDC 66 receives a ten volt gate voltage which allows HSDC to operate as a switch allowing current to flow from the drain to the source through C-coil 18. The current $I_C$ through C-coil 18 continues to increase as the current $I_A$ through A-coil 14 continues to decrease. The circuitry coupled to node $V_B$ continues to regulate the current $I_B$ through B-coil 16 as $I_A$ and $I_C$ transition. Thus, the slew rate of the current $I_A$ and $I_C$ is controlled and the current transitions through stator winding 10 at a rate to eliminate any of the negative effects discussed above.

FIG. 5 is a timing diagram illustrating stator current $I_A$ of A-coil 14, $I_B$ of B-coil 16, and $I_C$ of C-coil 18. State one corresponds to the currents provided by the circuitry of FIG. 1, and state two corresponds to the currents generated by the circuitry of FIG. 2. State three corresponds to the currents provided or maintained by the circuitry shown in FIG. 3, while state four corresponds to the currents generated by the circuitry of FIG. 4.

As can be seen, during steady state after a high side commutation and as illustrated in FIG. 1, $I_A$ is shown flowing in a positive direction, or into the center tap, from node $V_A$ and through A-coil 14. $I_B$ is shown flowing in the negative direction from the center tap and through C-Coil 18 to node $V_C$. State two illustrates a controllable slew rate or current controlled low side commutation in which $I_B$ transitions from a zero or open state level to a negative value. Simultaneously, $I_C$ transitions from its steady state negative value to a zero level. $I_A$ is maintained in the positive direction. An exemplary circuitry used to perform the low side commutation is shown in FIG. 2.

State three represents the steady state operation after a low side commutation where $I_A$ is shown at a positive level, $I_B$ at a negative level and $I_C$ at a zero level. An exemplary circuit used to generate $I_A$, $I_B$, and $I_C$ during steady state operation after a low side commutation is shown in FIG. 3. State four illustrates a high side commutation in which $I_A$ transitions from flowing in a positive direction to being shut off. $I_C$ is shown transitioning from being shut off to flowing in a positive direction. As can be seen, these transitions occur concurrently. $I_B$ continues at a constant, negative value.

As is illustrated in state two and state four of FIG. 5, the slew rate during a low side commutation and high side commutation is controlled. Although the present illustration shows a linear slew rate or linear current control during the low side and high side commutations, the present invention is not limited to only linear slew rate or current control. Any of a variety of known circuitry may be implemented to generate a slew rate or current control having a desired function or shape.

Thus, it is apparent that there has been provided, in accordance with the present invention, a circuitry and method for controllable slew rate that satisfy the advantages set forth above. Although the preferred embodiment has been described in detail, it should be understood that various changes, substitutions, and alterations can be made herein without departing from the scope of the present invention. For example, although the present invention has been illustrated and described with respect to controlling the currents in the stator windings of a three-phase dc motor, the present invention is not limited to applications involving only three-phase dc motors. Also, even though the present invention has been described and shown as being implemented using FET or field effect transistor technology, it should be understood that the present invention is not so limited. The present invention may be implemented by one of ordinary skill in the art using a variety of other technologies such as bipolar junction transistor technology.

The circuits described and illustrated in the preferred embodiment as discrete or separate circuits may be combined into one circuit or split into separate circuits without departing from the scope of the present invention. Furthermore, the direct connections illustrated herein could be altered by one skilled in the art such that two devices are merely coupled to one another through an intermediate device or devices without being directly connected while still achieving the desired results demonstrated by the present invention. For example, sample amplifier 34 is shown in FIG. 1 as being directly coupled to capacitor switch 20 although other devices could be coupled between them without departing from the present invention. Other examples of changes, substitutions, and alterations are readily ascertainable by one skilled in the art and could be made without departing from the spirit and scope of the present invention as defined by the following claims.

What is claimed is:

1. A method for controlling the slew rate of the coils in a polyphase dc motor comprising the steps of:

performing a high side commutation;

regulating a first current through a first coil and a second current through a second coil, the first coil and second coil having a first end and a second end, the first ends coupled to a center tap, the second end of the first coil coupled to a first coil high side driver for providing a current, and the second end of the second coil coupled to a second coil low side driver for regulating the current;

performing a low side commutation by reducing the second current through the second coil while correspondingly increasing a third current through a third coil, the third coil having a first end coupled to the center tap and a second end coupled to a third coil low side driver for regulating the third current, the second current reduced to zero wherein the first current is equal to the third current;

regulating a magnitude of the third current; and performing a high side commutation by reducing the first current through the first coil while correspondingly increasing the second current through the second coil, the second end of the second coil coupled to a second coil high side driver for providing a current, the first current reduced to zero wherein the second current is equal to the third current.

2. A method for controlling the slew rate of the coils in a polyphase dc motor comprising the steps of:

performing a high side commutation;

regulating a first current through a first coil and a second current through a second coil, the first coil and second coil having a first end and a second end, the first ends coupled to a center tap, the second end of the first coil coupled to a first coil high side driver for providing a current, and the second end of the second coil coupled to a second coil low side driver for regulating the current;

performing a low side commutation by reducing the second current through the second coil while correspondingly increasing a third current through a third coil, the third coil having a first end coupled to the center tap and a second end coupled to a third coil low side driver for regulating the third current, the second current reduced to zero wherein the first current is equal to the third current;

regulating the third current; and performing a high side commutation by reducing the first current through the first coil while correspondingly increasing the second current through the second coil, the second end of the second coil coupled to a second coil high side driver for providing a current, the first current reduced to zero wherein the second current is equal to the third current;

further comprising the step of sampling the low side voltage generated at the second end of the second coil to generate a sampled voltage while regulating the first current and second current.

3. The method of claim 2, further comprising the step of increasing the sampled voltage while performing the low side commutation step.

4. The method of claim 3, wherein the second current is decreased and the third current is increased in the performing a low side commutation step at a rate provided by the increasing sampled voltage.

5. The method of claim 4, wherein the sampled voltage is increased at a constant rate.

6. The method of claim 4, wherein the sampling the low side voltage step includes using a capacitor to sample the low side voltage.

7. The method of claim 6, wherein the sampled voltage is increased by providing the current from a current source to further charge the capacitor.

8. The method of claim 6, wherein the sampled voltage is increased according to a function dependent upon the motor conditions.

9. A method for controlling the slew rate of the coils in a polyphase dc motor comprising the steps of:
   performing a high side commutation;
   regulating a first current through a first coil and a second current through a second coil, the first coil and second coil having a first end and a second end, the first ends coupled to a center tap, the second end of the first coil coupled to a first coil high side driver for providing a current, and the second end of the second coil coupled to a second coil low side driver for regulating the current;
   performing a low side commutation by reducing the second current through the second coil while correspondingly increasing a third current through a third coil, the third coil having a first end coupled to the center tap and a second end coupled to a third coil low side driver for regulating the third current, the second current reduced to zero wherein the first current is equal to the third current;
   regulating the third current; and
   performing a high side commutation by reducing the first current through the first coil while correspondingly increasing the second current through the second coil, the second end of the second coil coupled to a second coil high side driver for providing a current, the first current reduced to zero wherein the second current is equal to the third current;
   wherein the second current is decreased and the third current is increased at about a linear rate in the performing a low side commutation step.

10. A method for controlling the slew rate of the coils in a polyphase dc motor comprising the steps of:
    performing a high side commutation;
    regulating a first current through a first coil and a second current through a second coil, the first coil and second coil having a first end and a second end, the first ends coupled to a center tap, the second end of the first coil coupled to a first coil high side driver for providing a current, and the second end of the second coil coupled to a second coil low side driver for regulating the current;
    performing a low side commutation by reducing the second current through the second coil while correspondingly increasing a third current through a third coil, the third coil having a first end coupled to the center tap and a second end coupled to a third coil low side driver for regulating the third current, the second current reduced to zero wherein the first current is equal to the third current;
    regulating the third current; and
    performing a high side commutation by reducing the first current through the first coil while correspondingly increasing the second current through the second coil, the second end of the second coil coupled to a second coil high side driver for providing a current, the first current reduced to zero wherein the second current is equal to the third current;
    further comprising the step of sampling the high side voltage generated at the second end of the first coil to generate a sampled voltage while regulating the first current and the third current.

11. The method of claim 10, further comprising the step of decreasing the sampled voltage while performing the high side commutation step.

12. The method of claim 11, wherein the first current is decreased and the second current is increased in the performing a high side commutation step at a rate provided by the decreasing sampled voltage.

13. The method of claim 12, wherein the sampling the high side voltage step includes using a capacitor to sample the low side voltage.

14. The method of claim 13, wherein the sampled voltage is decreased by discharging the capacitor using a current source.

15. A circuit for controlling the slew rate in the coils of a three-phase, dc motor, each coil having a first end and a second end, the first end of each coil coupled to a center tap, the circuit comprising:
    a first steady state control circuit operable to regulate the current through a first coil and a second coil after a high side commutation, the second end of the first coil coupled to a first high side driver and the second end of the second coil coupled to a second low side driver;
    a low side commutation circuit operable to perform a low side commutation by decreasing the current through the second coil while concurrently increasing the current through a third coil at a definable rate; and
    a second steady state control circuit operable to regulate a magnitude of the current through the first coil and the third coil after the low side commutation, the second end of the first coil coupled to the first high side driver and the second end of the third coil coupled to a third low side driver.

16. A circuit for controlling the slew rate in the coils of a three-phase, dc motor, each coil having a first end and a second end, the first end of each coil coupled to a center tap, the circuit comprising:
    a first steady state control circuit operable to regulate the current through a first coil and a second coil after a high side commutation, the second end of the first coil coupled to a first high side driver and the second end of the second coil coupled to a second low side driver;
    a low side commutation circuit operable to perform a low side commutation by decreasing the current through the second coil while concurrently increasing the current through a third coil at a definable rate; and
    a second steady state control circuit operable to regulate the current through the first coil and the third coil after the low side commutation, the second end of the first coil coupled to the first high side driver and the second end of the third coil coupled to a third low side driver;
    further comprising:
    a high side commutation circuit operable to perform a high side commutation by decreasing the current through the first coil while concurrently increasing the current through the second coil at a definable rate.

17. A circuit for controlling the slew rate in the coils of a three-phase, dc motor, each coil having a first end and a second end, the first end of each coil coupled to a center tap, the circuit comprising:
    a first steady state control circuit operable to regulate the current through a first coil and a second coil after a high side commutation, the second end of the first coil coupled to a first high side driver and the second end of the second coil coupled to a second low side driver;
    a low side commutation circuit operable to perform a low side commutation by decreasing the current through the second coil while concurrently increasing the current through a third coil at a definable rate; and
    a second steady state control circuit operable to regulate the current through the first coil and the third coil after the low side commutation, the second end of the first coil coupled to the first high side driver and the second end of the third coil coupled to a third low side driver;

wherein the first steady state control circuit includes a capacitor coupled to the second end of the second coil to charge the capacitor to the voltage provided at the second end of the second coil, and the low side commutation circuit includes the charged capacitor and a current source operable to further charge the capacitor while concurrently decreasing the current through the second coil and increasing the current through the third coil at a rate related to the charging of the capacitor by the current source.

18. The circuit of claim 16, wherein the second steady state control circuit includes a capacitor coupled to the second end of the first coil to charge the capacitor to the voltage provided at the second end of the first coil, and the high side commutation circuit includes the charged capacitor and a current source operable to discharge the capacitor while concurrently decreasing the current through the first coil and increasing the current through the second coil at a rate related to the discharging of the capacitor by the current source.

19. A circuit for controlling the slew rate in the stator coils of a polyphase, dc motor, each coil having a first end and a second end, the first end of each coil coupled to a center tap, the circuit comprising:

a first steady state control circuit operable to regulate the current through a high side coil and a first low side coil after a high side commutation, the high side coil having its second end coupled to a voltage source through a high side driver and the first low side coil having its second end coupled to a low side driver, a low side commutation circuit operable to perform a low side commutation by decreasing the current through the first low side coil while concurrently increasing the current through a second low side coil at a predefined rate, the low side commutation circuit operable to perform additional low side commutations as needed;

a second steady state control circuit operable to regulate a magnitude of the current through the high side coil and the second low side coil after the low side commutation; and a high side commutation circuit operable to perform a high side commutation by decreasing the current through the high side coil while concurrently increasing the current through a second high side coil that previously served as a low side coil, the concurrent decreasing the increasing of the current occurring at a predefined rate.

20. A circuit for controlling the slew rate in the stator coils of a polyphase, dc motor, each coil having a first end and a second end, the first end of each coil coupled to a center tap, the circuit comprising:

a first steady state control circuit operable to regulate the current through a high side coil and a first low side coil after a high side commutation, the high side coil having its second end coupled to a voltage source through a high side driver and the first low side coil having its second end coupled to a low side driver;

a low side commutation circuit operable to perform a low side commutation by decreasing the current through the first low side coil while concurrently increasing the current through a second low side coil at a predefined rate, the low side commutation circuit operable to perform additional low side commutations as needed;

a second steady state control circuit operable to regulate the current through the high side coil and the second low side coil after the low side commutation; and a high side commutation circuit operable to perform a high side commutation by decreasing the current through the high side coil while concurrently increasing the current through a second high side coil that previously served as a low side coil, the concurrent decreasing the increasing of the current occurring at a predefined rate;

wherein the first steady state control circuit includes a capacitor coupled to the second end of the first low side coil to charge the capacitor to the voltage provided at the second end of the first low side coil, and the low side commutation circuit includes the charged capacitor and a current source operable to further charge the capacitor while concurrently decreasing the current through the first low side coil and increasing the current through the second low side coil at a rate related to the charging of the capacitor by the current source.

* * * * *